(12) United States Patent
Bas et al.

(10) Patent No.: US 11,003,615 B2
(45) Date of Patent: May 11, 2021

(54) SINGLE-WIRE BUS COMMUNICATION PROTOCOL

(71) Applicant: STMICROELECTRONICS (ROUSSET) SAS, Rousset (FR)

(72) Inventors: Gilles Bas, Beauvoisin (FR); Hervé Chalopin, Aubagne (FR); François Tailliet, Fuveau (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 557 days.

(21) Appl. No.: 15/423,479

(22) Filed: Feb. 2, 2017

(65) Prior Publication Data

US 2017/0206182 A1 Jul. 20, 2017

Related U.S. Application Data

(62) Division of application No. 13/189,781, filed on Jul. 25, 2011, now Pat. No. 9,639,500.

(30) Foreign Application Priority Data

Jul. 27, 2010 (FR) ...................................... 1056148

(51) Int. Cl.
*G06F 13/42* (2006.01)
*G06F 1/3212* (2019.01)
*G06F 1/3287* (2019.01)
*G06F 13/364* (2006.01)

(52) U.S. Cl.
CPC ........ *G06F 13/4282* (2013.01); *G06F 1/3212* (2013.01); *G06F 1/3287* (2013.01); *G06F 13/364* (2013.01); *G06F 13/4295* (2013.01)

(58) Field of Classification Search
CPC .................................................. G06F 13/4282
USPC ........................................................ 375/253
See application file for complete search history.

(56) References Cited

U.S. PATENT DOCUMENTS

| | | | |
|---|---|---|---|
| 5,495,469 A | 2/1996 | Halter et al. | |
| 5,903,607 A | 5/1999 | Tailliet | |
| 6,112,275 A | 9/2000 | Curry et al. | |
| 6,532,506 B1 * | 3/2003 | Dunstan .............. | G06F 13/4295 326/86 |
| 6,735,657 B1 | 5/2004 | Falk et al. | |
| 6,874,052 B1 | 3/2005 | Delmonico | |
| 7,111,097 B2 | 9/2006 | Lin | |
| 8,161,224 B2 | 4/2012 | Laurencin et al. | |
| 8,214,649 B2 | 7/2012 | Wood | |
| 8,230,151 B2 | 7/2012 | Hou et al. | |

(Continued)

FOREIGN PATENT DOCUMENTS

WO 2010/010278 A1 1/2010

OTHER PUBLICATIONS

Del Torte et al., "Multiple Signatures using Security Multiparts," The Internet Society: OpenPGP Working Group, draft-ietf-openpgp-multsig-02.txt, pp. 1-6, 2001.

(Continued)

*Primary Examiner* — Lihong Yu
(74) *Attorney, Agent, or Firm* — Seed IP Law Group LLP

(57) ABSTRACT

A method to transmit data over a single-wire bus wherein a first communication channel is defined by pulses of different durations according to the state of the transmitted bit and depending on a reference duration, and a second communication channel is defined by the reference duration.

20 Claims, 3 Drawing Sheets

(56) References Cited

U.S. PATENT DOCUMENTS

| | | |
|---|---|---|
| 8,285,990 B2 | 10/2012 | Nakhjiri |
| 8,296,832 B2 | 10/2012 | Atwood et al. |
| 8,437,473 B2 | 5/2013 | Gantman et al. |
| 8,671,278 B2 | 3/2014 | Bas et al. |
| 2004/0049619 A1 | 3/2004 | Lin |
| 2004/0208200 A1 | 10/2004 | Hejdeman et al. |
| 2006/0005033 A1 | 1/2006 | Wood |
| 2006/0104396 A1 | 5/2006 | Soriano et al. |
| 2006/0239693 A1* | 10/2006 | Wada ............... H04L 25/4902 398/141 |
| 2006/0282675 A1 | 12/2006 | Yao |
| 2007/0230614 A1 | 10/2007 | Walker et al. |
| 2008/0229104 A1 | 9/2008 | Ju et al. |
| 2009/0003597 A1 | 1/2009 | Gantman et al. |
| 2009/0013100 A1 | 1/2009 | Lee |
| 2010/0017553 A1 | 1/2010 | Laurencin et al. |
| 2010/0308838 A1* | 12/2010 | Lee ...................... B41J 2/17546 324/537 |
| 2012/0030753 A1 | 2/2012 | Bas et al. |
| 2012/0054392 A1 | 3/2012 | Li |
| 2012/0144078 A1 | 6/2012 | Poulsen |

OTHER PUBLICATIONS

French Search Report dated Feb. 10, 2011, for French Application No. 10/56148, 2 pages.

French Search Report dated Feb. 24, 2011, for French Application No. 10/56149, 2 pages.

French Search Report dated Feb. 24, 2011, for French Application No. 10/56152, 2 pages.

Menezes, et al. "Hash Functions and Data Integrity," *Handbook of Applied Cryptography*, pp. 353-368, 1997. (19 pages).

"Message authentication code," retrieved from http://en.wikipedia.org/wiki/Message_authentication_code, retrieved on Nov. 9, 2012, 4 pages.

Moussa, "Digital Signature and Multiple Signature: Different Cases for Different Purposes," SANS Institute InfoSec Reading Room, pp. 1-10, 2003.

Philips Semiconductor, "The $I^2$C-bus specification," document order No. 9398 393 40011, Version 2.1, 2000, 46 pages.

\* cited by examiner

US 11,003,615 B2

SINGLE-WIRE BUS COMMUNICATION PROTOCOL

CROSS REFERENCE TO RELATED APPLICATIONS

This application is a Divisional of U.S. application Ser. No. 13/189,781, filed on Jul. 25, 2011, which claims the priority benefit of French patent application number 10/56148, filed on Jul. 27, 2010, entitled SINGLE-WIRE BUS COMMUNICATION PROTOCOL, which are hereby incorporated by reference to the maximum extent allowable by law.

BACKGROUND OF THE INVENTION

Field of the Invention

The present invention generally relates to electronic circuits and, more specifically, to the transmission of digital data between two circuits in a master-slave type transmission system. The present invention more specifically applies to a protocol of communication over a single-wire bus.

Discussion of the Related Art

A so-called single-wire bus protocol is generally used to transmit data between several electronic circuits over a single communication wire (in addition to a common reference or ground). In a single-wire protocol, a synchronization signal and data (and if need be, the receiver power supply) are transmitted over the same wire.

A single-wire bus communication protocol is described, for example, in U.S. Pat. No. 5,903,607.

A limitation of such a protocol is that it generally uses a single channel.

SUMMARY OF THE INVENTION

An embodiment provides a single-wire bus communication protocol which overcomes all or part of the disadvantages of known protocols.

Another embodiment provides a dual-channel protocol.

Another embodiment provides a solution compatible with the bidirectionality of a single-wire protocol.

An embodiment provides a method of data transmission over a single-wire bus, wherein:

a first communication channel is defined by pulses of different durations according to the state of the transmitted bit and depending on a reference duration; and a second communication channel is defined by said reference duration.

According to an embodiment, each pulse of the first channel has a duration greater or smaller than the reference duration according to the state of the transmitted bit.

According to an embodiment, said reference duration is selected from a set of durations according to a code transmitted over the second channel.

According to an embodiment, said reference duration is fixed for a word of several bits.

According to an embodiment each word of the first channel starts with a reference pulse having its duration providing the reference duration.

According to an embodiment, the bus is, when idle, at a first voltage level, said pulses being separated from one another by periods of fixed duration at a second voltage level.

According to an embodiment, said pulses have durations corresponding to multiples of said periods of fixed duration.

According to an embodiment, the first level is higher than the second one.

An embodiment also provides a device for transmitting over a single-wire bus.

An embodiment also provides a device for receiving over a single-wire bus.

The foregoing and other objects, features, and advantages of embodiments will be discussed in detail in the following non-limiting description of specific embodiments in connection with the accompanying drawings.

DETAILED DESCRIPTION

Figure 1:
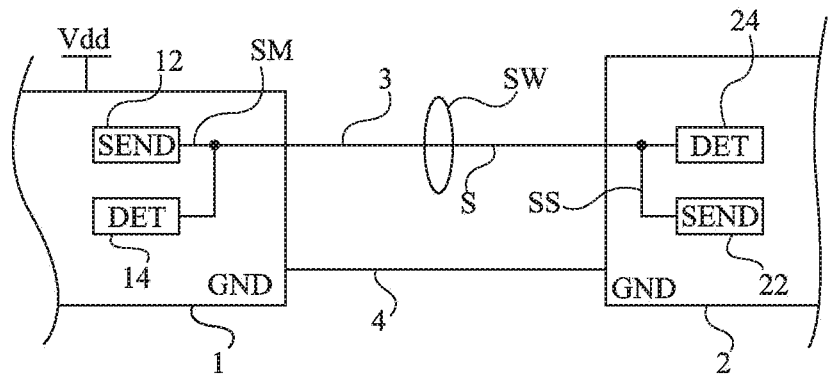
FIG. 1 partially shows in the form of blocks two circuits capable of communicating according to a master-slave protocol over a single-wire bus.

The same elements have been designated with the same reference numerals in the different drawings. For clarity, only those elements which are useful to the understanding embodiments have been shown and will be described. In particular, the mechanisms of generation of the data to be transmitted have not been detailed, embodiments being compatible with mechanisms currently used to transmit data in a single-wire protocol. Further, the transmit and receive circuits have not been detailed either, embodiments being here again compatible with usual systems.

To create a dual-channel protocol, it could have been devised to vary the voltage levels on the bus to define a second communication channel. However, such a solution would be poorly adapted to circuits in which the voltage levels are likely to vary for other reasons (line length, various disturbances, etc.). Further, this would make a power recovery by the receiver more difficult since this would impose a low level closer to ground.

FIG. 1 is a partial block diagram of an embodiment of a single-wire bus communication system. In the example of FIG. 1, a circuit 1, arbitrarily considered as a master circuit, is capable of communicating according to a single-wire protocol SW with a distant circuit 2. Circuits 1 and 2 are connected by a wire 3 forming the single-wire bus and share the same reference voltage (connection 4—ground GND).

Each circuit 1, 2 for example comprises a transmit circuit (SEND) 12, respectively 22, and a receive circuit (DET) 14, respectively 24. For a communication from circuit 1 to circuit 2, circuit 1 imposes a signal SM on the bus. For a communication from circuit 2 to circuit 1, circuit 2 imposes a signal SS on the bus. The circuit which causes the transmission imposes the clock on the bus. For simplification, signals SM and SS have been schematized in FIG. 1 as respectively originating from circuits 12 and 22 and it is considered that circuits 14 and 24 only see the state of the signal S present on the bus. Further, circuits 1 and 2 comprise other elements, especially for exploiting the transmitted signals. Independently from the communication, master circuit 1 generally powers slave circuit 2 as illustrated in FIG. 1 where only master circuit 1 receives a power supply voltage Vdd. Slave circuit 2 draws its power supply from a regulation of signal S having its idle level, generally imposed by circuit 1, at a high level VH.

Figure 2:
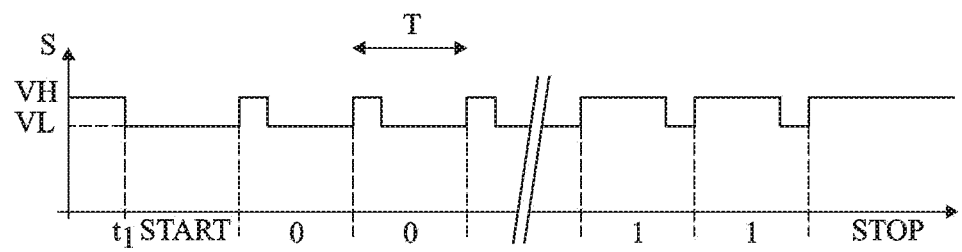
FIG. 2 is a timing diagram illustrating a usual communication between the two circuits of FIG. 1.

FIG. 2 is a timing diagram showing an example of the shape of signal S illustrating a communication between circuits 1 and 2.

The single-wire protocol comprises transmitting, over bus 3, both a clock or synchronization signal and the data.

To transmit data from circuit 1 to circuit 2, circuit 1 modulates signal SM in amplitude between two levels VH and VL, for example, both positive to preserve the power supply of circuit 2. This modulation appears on signal S. The idle level of the bus is high level VH. In the shown example, a transmission is initialized by a start bit START with which signal S is forced (time t1) to level VL. This initializes slave circuit 2 and prepares it to receive data. Circuit 1 modulates the level of signal S at the rate of a clock signal which sets the transmission flow rate. The transmission of a bit at level 0 is for example performed with a pulse of level VL of a duration shorter than the half-period of the clock signal (in the shown example, one quarter of period T) while a level 1 is coded with a pulse of level VL of a duration greater than the half-period of this signal (for example, three quarters of period T). Slave circuit 2 detects the amplitude variation and the corresponding duration of the high and low pulses to determine the value of the transmitted bits. An end of transmission (generally the end of a frame) is coded by circuit 1 in the form of a high state (deallocation of the bus) for a time period greater than period T.

Single-wire bus SW is half-duplex bus. To transmit data from slave circuit 2 to master circuit 1, the slave circuit modifies the load that it imposes on wire S according to the level of the bit that it desires to transmit. Here again, the transmission rate is set by a clock signal at the rate of which circuit 2 modulates the amplitude of signal S. The clock is here set by an internal clock of circuit 2 while the idle level (VH) of the bus remains set by circuit 1.

Figure 3:
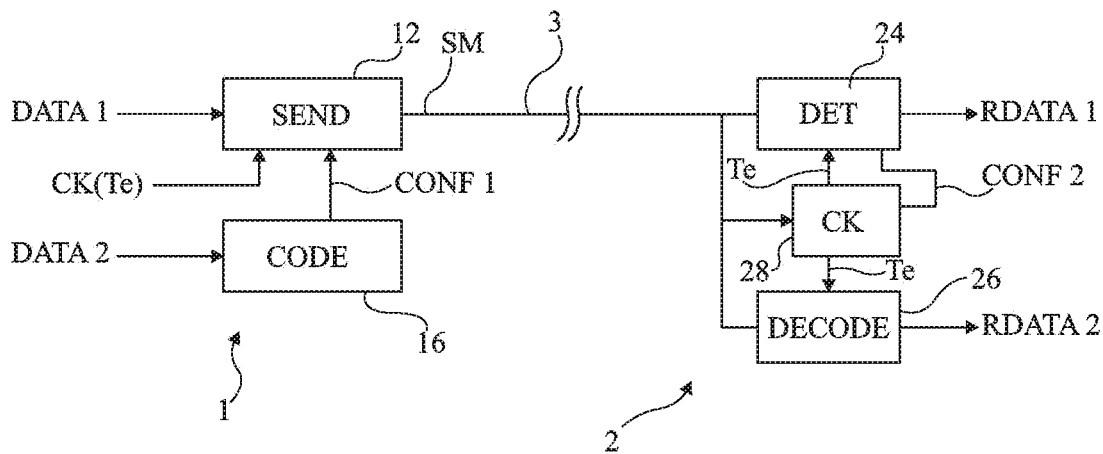
FIG. 3 is a partial block diagram of an implementation mode of a dual-channel communication protocol.
Figure 4:
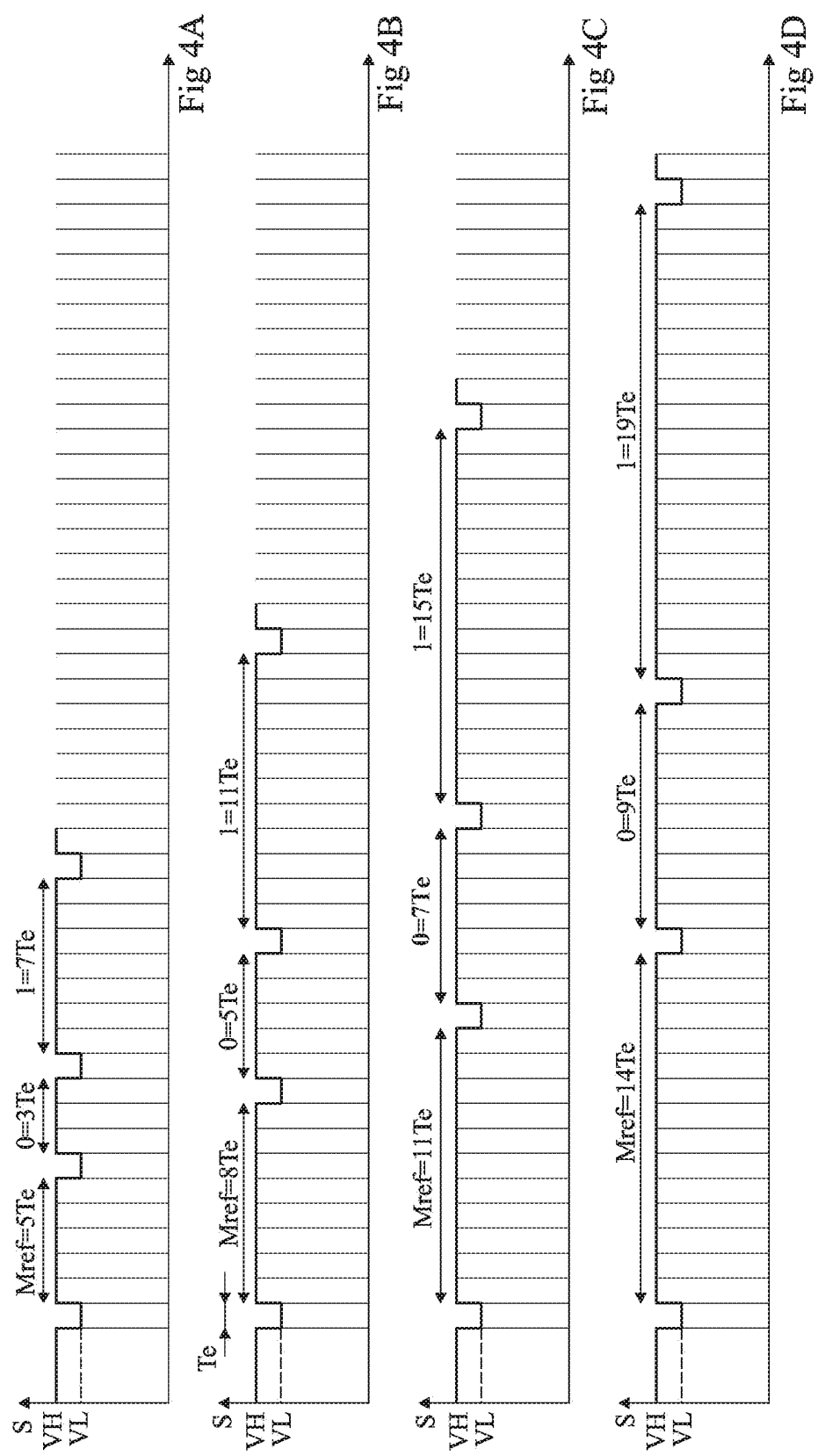
FIGS. 4A, 4B, 4C, and 4D are timing diagrams illustrating the operation of the system illustrated in FIG. 3.

FIG. 3 is a block diagram illustrating an embodiment of a dual-channel single-wire bus system. To simplify the representation of FIG. 3, only the transmit portion on the side of master circuit 1 and the receive portion on the side of slave circuit 2 have been shown.

FIGS. 4A, 4B, 4C, and 4D are timing diagrams illustrating the operation of the system of FIG. 3. These drawings show four examples of signal S on bus 3 illustrating four possible states for a transmission over a second channel.

According to this embodiment, and unlike the protocol illustrated in FIG. 2, the bits of a first channel are coded by pulses in high state VH over a different number of clock periods Te according to state 0 or 1 to be transmitted, each bit being separated from the next one by a low-level square pulse of fixed duration, for example, one clock period Te.

In practice, a data word to be transmitted is preceded by a reference pulse Mref, transmitted by circuit 12 and having its duration measured by the receiver. Pulse Mref enables to synchronize the circuits. Circuits 1, 2 both have internal clocks of identical frequencies (as close as possible). These internal clocks have a period shorter than or equal to period Te. On the receiver side, the internal clock is used by a counter to determine the value (for example, the number of periods Te) of pulse Mref and to thus be able to discriminate states 1 and 0 of the next pulses transmitting the bits. If the pulse coding the bit has a duration shorter than the so-called reference duration of pulse Mref, the state is 0 (by arbitrary convention). If the pulse coding the bit has a duration greater than the reference duration, the state is 1. The discrimination between states 0 and 1 of the bits of the first channel is performed by comparing the duration of the pulses with the reference duration.

To code the second channel, it is provided to make the reference durations of the first channel variable. Thus, functionally and as schematically illustrated in FIG. 3, transmit block 12 receives not only a first data flow DATA1 to be transmitted and clock signal CK of period Te (multiple of the internal clock), but also a signal CONF1 which sets the reference duration, and thus the respective durations of the pulses assigned to states 0 and 1 of the first channel. Signal CONF1 originates from a coding circuit 16 (CODE) which sets it according to a second data flow DATA2 to be transmitted over the second channel.

In the example of FIGS. 4A to 4D, it is assumed that signal CONF1 configures circuit 12 so that it codes the reference duration, respectively to 5, 8, 11, and 14 periods Te and codes the bits of signal DATA1 to state 0 respectively over 3, 5, 7, and 9 periods of signal Te and the bits at state 1 respectively over 7, 11, 15, and 19 periods Te. This coding enables to transmit, over the second channel, a pair of bits for each word of the first channel.

Detection circuit 24 of receiver 2 receives the modulated signal over bus 3. This signal is sent in parallel to a clock extraction circuit 28 (CK) and to a circuit 26 (DECODE) in charge of extracting the data from the second channel RDATA2. According to a first example, period Te is known and fixed on both sides of the transmission. According to another example, circuit 28 extracts period Te (clock CK) of the low-level square pulses present on signal S. Circuit 28 also provides, by decoding pulse Mref, a signal CONF2 of configuration of detector 24 so that the latter properly decodes data RDATA1 according to the reference duration (number of periods Te) respectively setting states 0 and 1.

The selection of the number of periods Te of interval between the different reference patterns Mref may vary. Preferably, an interval of at least three periods between two reference patterns is provided to improve the reliability of the detection.

It should be noted that the two channels do not interfere with each other and are independent.

For example, and to be compatible with the data usually transmitted in systems using a single-wire bus, the data words are transmitted in bytes. Each byte is then preferably preceded by a reference pulse Mref, which enables to transmit over the second channel at least one bit per byte of the first channel (one bit per byte for a coding from among two reference pulses, two bits per byte for a coding from among four reference pulses, etc.).

The beginning of a transmission is indicated by a specific pattern, for example, a low state for a period Te followed by a high state defining duration Mref, then by a new switching to the low state. This pattern will be interpreted as a start-of-transmission pattern if the frame receiver is in a reset state or if it receives successive bits between which duration Mref is interposed and recognizes the positioning of duration Mref according to the number and to the value of the previously-received bits.

Figure 5:
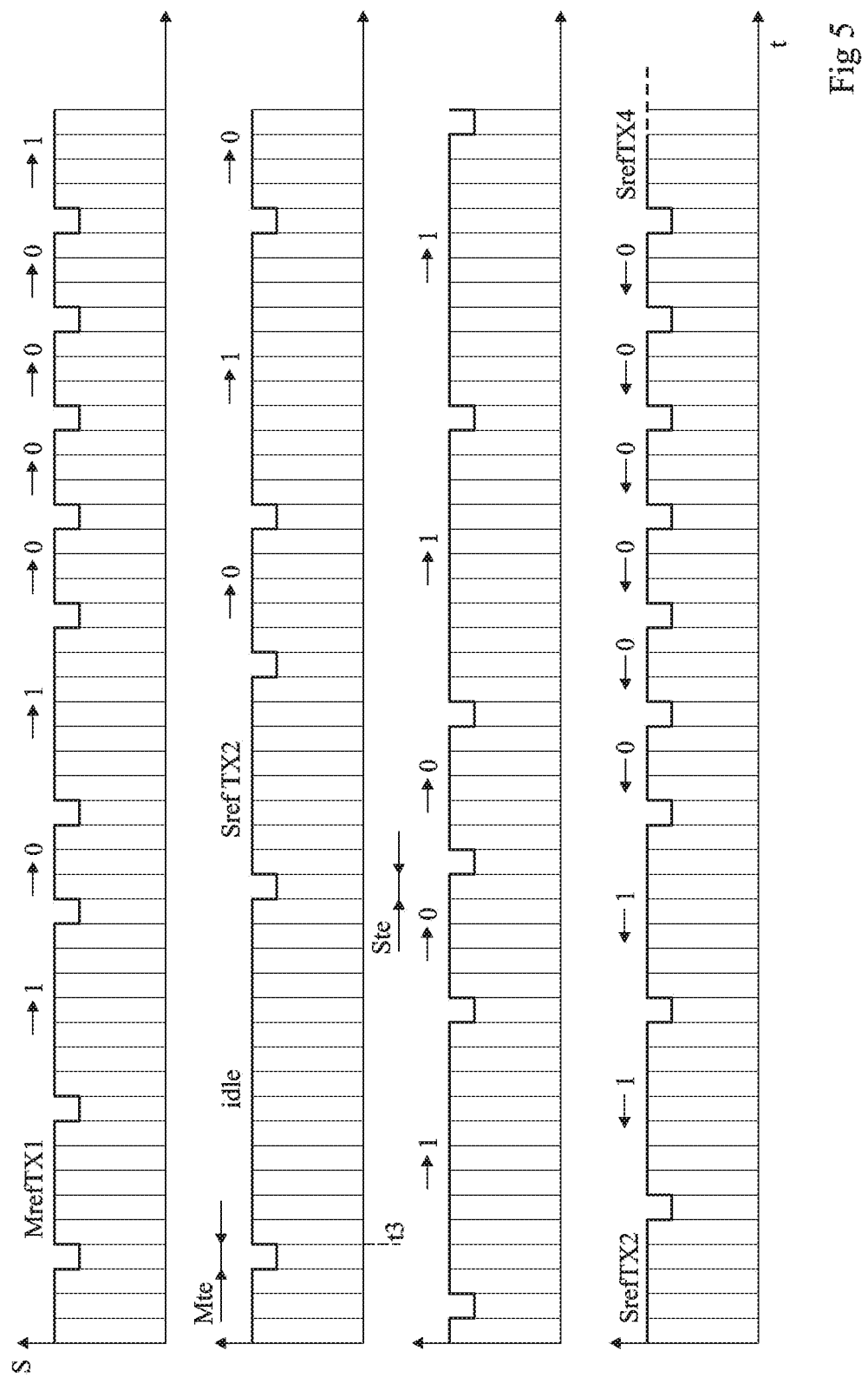
FIG. 5 is a timing diagram illustrating a dual-channel bidirectional transmission over a single-wire bus.

FIG. 5 is a timing diagram illustrating the transmission of a frame in the master-to-slave direction and the response of the slave to the master. The timing diagram of FIG. 5 is shown over four lines which should be successively read from top to bottom. It is assumed that circuit 1 sends an end-of-frame ending with a word "10100001" preceded by a reference pulse Mref (code TX1) for example corresponding to the code of FIG. 4A. When the master circuit has finished its transmission, it deallocates the bus which is then idle (instant t3). Circuit 2 can then respond. In this example, the slave circuit sends a reference pulse SRefTX2 for example corresponding to the coding of FIG. 4B, followed by an 8-bit word "01010011". This first word is followed by a second word "11000000" with the same code TX2. At the third word, the slave circuit switches to a code TX4 corresponding, for example, to the coding of FIG. 4D for the next word.

In the slave-to-master direction, the period, noted STe, conditioning the coding on the second channel, is set by the slave circuit to a value theoretically identical to period MTe.

The foregoing shows that circuit 1 is equipped with detection and decoding circuits similar to circuits 24, 26, and 28 and circuit 2 is equipped with transmit and coding circuits similar to circuits 12 and 16 of circuit 1.

The coding with the reference duration is preferably performed for each word. This enables to transmit data of the second channel for each word of the first channel. With a coding over four reference durations, each transmitted piece of data actually represents a coding over two bits.

It may be sufficient to code the second channel with reference pulse MRef or SRef since periods Te on the master circuit and on the slave circuit are supposed to be identical. For the case where an inaccuracy due to a time offset of the signal is feared, the duration of states 1 and of states 0 may be interpreted over the entire byte. This enables, for example by statistical analysis, to solve inaccuracies that may have occurred (if a majority of the pulses of the first channel respects what should correspond to the durations associated with the reference duration, the code of the second channel is considered to have the corresponding value). However, this requires counting and storing the number of periods Te over the entire word.

The implementation of embodiments takes advantage from the fact that, in applications using a single-wire bus, reference durations are generally programmable in transmit and receive circuits. Accordingly, implementation of embodiments requires in practice little or no structural modification of the circuits.

According to a specific example of implementation, the fact of coding, on a separate channel, two additional bits per data byte of the first channel enables, over of frame of 32 bytes of the first channel, coding 64 bits over the second channel.

The number of bits transmitted by the second channel may vary, provided for this number to be compatible with the maximum duration expected for the data of the first channel. Indeed, the higher this number, the longer the reference duration.

The presence of a second channel provides many possibilities in systems usually using single-wire buses.

For example, the second channel enables identifying the master and/or the slave in a communication system of more than two circuits.

According to another example of application, the second channel enables to code an identifier, for example, to associate a consumable to a type of device (ink cartridge for a printer, telephone battery for a telephone) or to a brand. For example, a printer consumable integrating a slave circuit becomes incompatible with another printer if it is not able to decode the second channel.

According to another example still, the additional channel enables to transmit, at the same time as the data, a signature thereof. In a usual approach, a signature is transmitted over the same channel as the useful data, which lengthens the duration of the frames. With the described embodiments, the signature may be interposed in the transmission. Any signature or error-correction code mechanism may be used.

According to still another example, the second channel is used to send a specific control to the other circuits. For example, in an application such as a battery with respect to equipment or a cartridge with respect to a printer, the second channel may be used to transmit a message indicating that the battery or that the printer cartridge is empty.

According to still another example, each channel may be dedicated to an application of the master circuit for the same slave circuit.

Various embodiments have been described. Various alterations and modifications are within the abilities of those skilled in the art. Finally, the practical implementation of the present invention by using circuits known per se and by programming them properly is within the abilities of those skilled in the art based on the functional indications given hereabove. Further, the selection of the number of coding bits of the first channel as well as of the variation frequency of this coding (in the described example, all bytes) may vary according to applications.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method to transmit data on a single-wire bus, comprising:
    transmitting first channel data on the single-wire bus by transmitting data pulses having data pulse durations based on first channel data values and on reference pulse durations; and
    transmitting second channel data on the single-wire bus by transmitting reference pulses having the reference pulse durations, wherein the reference pulse durations are based on second channel data values, and wherein various ones of said reference pulse durations are variable during transmission of the first and second channel data values.

2. The method to transmit data as defined in claim 1, wherein a first value of the first channel data has a pulse duration less than a corresponding reference pulse duration and a second value of the first channel data has a pulse duration greater than the corresponding reference pulse duration.

3. The method to transmit data as defined in claim 2, wherein a first value of the second channel data corresponds to a first reference pulse duration and a second value of the second channel data corresponds to a second reference pulse duration.

4. The method to transmit data as defined in claim 1, wherein each of the reference pulse durations corresponds to a value of the second channel data.

5. The method to transmit data as defined in claim 1, wherein a reference pulse duration is fixed for a word of the first channel data.

6. The method to transmit data as defined in claim 5, wherein each word of the first channel data is preceded by a corresponding reference pulse that sets a reference pulse duration for a word of the first channel data following the reference pulse.

7. The method to transmit data as defined in claim 1, wherein the single wire bus is at a first voltage level when idle and wherein the data pulses and the reference pulses are separated from one another by periods of fixed duration at a second voltage level.

8. The method to transmit data as defined in claim 7, wherein the data pulse durations and the reference pulse durations are multiples of the periods of fixed duration.

9. A system to communicate data, comprising:
a single-wire bus;
a transmitting device, the transmitting device arranged to:
transmit first channel data on the single-wire bus by transmitting data pulses having data pulse durations based on first channel data values and on reference pulse durations;
transmit second channel data on the single-wire bus by transmitting reference pulses having the reference pulse durations, wherein the reference pulse durations are based on second channel data values, and wherein various ones of said reference pulse durations are variable during transmission of the first and second channel data values; and
a receiving device coupled to the transmitting device via the single-wire bus, the receiving device arranged to:
receive the transmitted data pulses on the single-wire bus;
determine the first channel data values based on the data pulse durations and on the reference pulse durations; and
determine the second channel data values based on the reference pulse durations.

10. The system to communicate data as defined in claim 9, wherein the transmitting device is arranged in one of a printer and an ink cartridge, and wherein the receiving device is arranged in a different one of the printer and the ink cartridge.

11. The system to communicate data as defined in claim 9, wherein the transmitting device is arranged in one of a mobile telephone and a battery, and wherein the receiving device is arranged in a different one of the mobile telephone and the battery.

12. The system to communicate data as defined in claim 9, wherein the transmitting device is a master device and the receiving device is a slave device.

13. A method to receive data on a single-wire bus, comprising:
receiving data pulses having data pulse durations and reference pulses having reference pulse durations on the single-wire bus;
determining first channel data values based on the data pulse durations and on the reference pulse durations; and
determining second channel data values based on the reference pulse durations, wherein each reference pulse duration is based on said second channel data values, and wherein various ones of said reference pulse durations are variable during transmission of the first and second channel data values.

14. The method to receive data as defined in claim 13, wherein a first value of the first channel data has a data pulse duration less than a corresponding reference pulse duration and a second value of the first channel data has a data pulse duration greater than the corresponding reference pulse duration.

15. The method to receive data as defined in claim 14, wherein a first value of the second channel data corresponds to a first reference pulse duration and a second value of the second channel data corresponds to a second reference pulse duration.

16. The method to receive data as defined in claim 13, wherein each of the reference pulse durations corresponds to a value of the second channel data.

17. The method to receive data as defined in claim 13, wherein a reference pulse duration is fixed for a word of the first channel data.

18. The method to receive data as defined in claim 17, wherein each word of the first channel data is preceded by a corresponding reference pulse that sets a reference pulse duration for a word of the first channel data following the reference pulse.

19. The method to receive data as defined in claim 13, wherein the single-wire bus is at a first voltage level when idle and wherein the data pulses and the reference pulses are separated from one another by periods of fixed duration at a second voltage level.

20. The method to receive data as defined in claim 19, wherein the data pulse durations and the reference pulse durations correspond to multiples of the periods of fixed duration.

* * * * *